US011859337B2

(12) United States Patent
McDonald et al.

(10) Patent No.: US 11,859,337 B2
(45) Date of Patent: *Jan. 2, 2024

(54) TAMPER RESISTANT APPLIANCE LATCH

(71) Applicant: ILLINOIS TOOL WORKS INC., Glenview, IL (US)

(72) Inventors: Randy S. McDonald, Sussex, WI (US); Joel C. Bragg, Waterford, WI (US); Jeffrey J. Krieger, Mukwonago, WI (US)

(73) Assignee: Illinois Tool Works Inc., Glenview, IL (US)

( * ) Notice: Subject to any disclaimer, the term of this patent is extended or adjusted under 35 U.S.C. 154(b) by 440 days.

This patent is subject to a terminal disclaimer.

(21) Appl. No.: 16/925,562

(22) Filed: Jul. 10, 2020

(65) Prior Publication Data

US 2020/0340164 A1 Oct. 29, 2020

Related U.S. Application Data

(63) Continuation of application No. 16/430,597, filed on Jun. 4, 2019, now Pat. No. 10,745,846, which is a continuation of application No. 15/039,873, filed as application No. PCT/US2014/059945 on Oct. 9, 2014, now Pat. No. 10,316,454.

(60) Provisional application No. 61/911,659, filed on Dec. 4, 2013.

(51) Int. Cl.
*D06F 37/42* (2006.01)
*D06F 39/14* (2006.01)
*E05B 47/00* (2006.01)

(52) U.S. Cl.
CPC .............. *D06F 37/42* (2013.01); *D06F 39/14* (2013.01); *E05B 47/0002* (2013.01)

(58) Field of Classification Search
CPC ................................ D06F 37/28; D06F 37/42
See application file for complete search history.

(56) References Cited

U.S. PATENT DOCUMENTS

| | | | |
|---|---|---|---|
| 4,074,545 | A | 2/1978 | Case |
| 4,365,830 | A | 12/1982 | Paulson |
| 5,520,424 | A | 5/1996 | Hapke et al. |
| 5,823,017 | A | 10/1998 | Hapke et al. |
| 6,322,114 | B1 | 11/2001 | Kurachi |
| 6,363,755 | B1 | 4/2002 | Hapke et al. |
| 7,251,961 | B2 | 8/2007 | Hapke et al. |
| 7,775,070 | B2 | 8/2010 | Lim et al. |
| 2009/0096222 | A1 | 4/2009 | Sans Rovira et al. |
| 2012/0175894 | A1 | 7/2012 | Hapke et al. |

(Continued)

FOREIGN PATENT DOCUMENTS

| | | | |
|---|---|---|---|
| EP | 2154287 | A1 | 2/2010 |
| WO | 2011109235 | A1 | 9/2011 |

OTHER PUBLICATIONS

1Search Report and Written Opinion for PCT/US2014/059945 dated Feb. 11, 2015, 11 pages.

*Primary Examiner* — Michael E Barr
*Assistant Examiner* — Kevin G Lee
(74) *Attorney, Agent, or Firm* — Boyle Fredrickson, S.C.

(57) ABSTRACT

An appliance latch receives a strike when the appliance lid is closed and provides an electrically activated lock holding the lid closed during portions of the wash cycle that might present a hazard. The strike presents two different surfaces to the latch, the first to activate a lock mechanism and the second to activate an anti-tamper switch before the appliance may be actuated thereby reducing the risk of tampering.

11 Claims, 6 Drawing Sheets

(56) References Cited

U.S. PATENT DOCUMENTS

| | | | |
|---|---|---|---|
| 2012/0312594 | A1 | 12/2012 | Hapke et al. |
| 2014/0035294 | A1 | 2/2014 | Promutico |

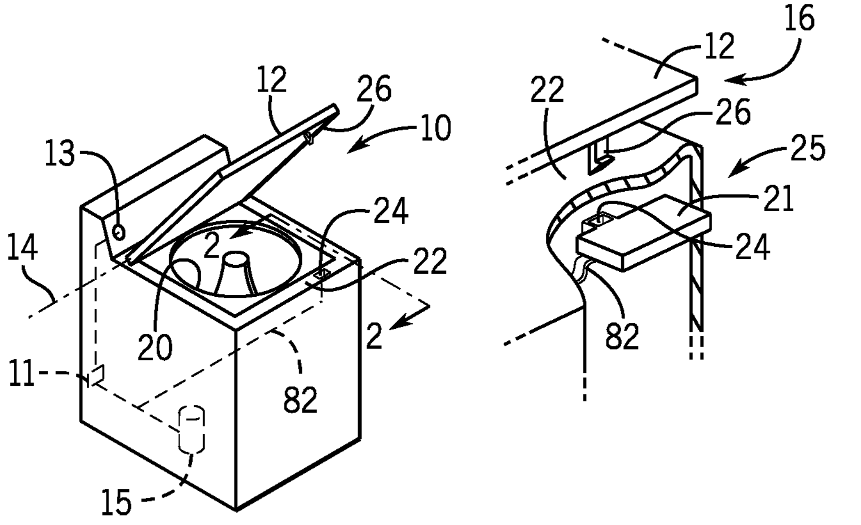
FIG. 1
FIG. 2
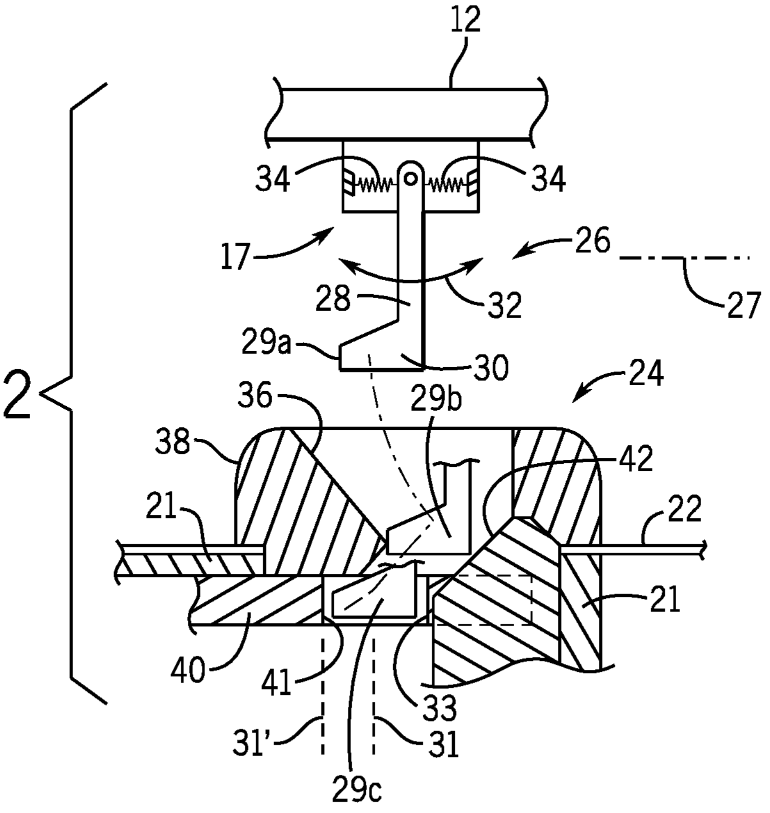

TAMPER RESISTANT APPLIANCE LATCH

CROSS-REFERENCE TO RELATED APPLICATION

This application is a continuation of U.S. patent application Ser. No. 16/430,597 filed Jun. 4, 2019 and entitled Tamper Resistant Latch, which is a continuation of U.S. Pat. No. 10,316,454 that granted on Jun. 11, 2019 as a US National Stage entry of the international application PCT/US2014/059945 filed Oct. 9, 2014, which claims the benefit of U.S. provisional application 61/911,659 filed Dec. 4, 2013, and all of which are hereby incorporated by reference in their entireties.

FIELD OF THE INVENTION

The present invention relates to home appliances such as clothes washing machines and the like and, in particular, to a lid locking mechanism that is highly resistant to tampering.

BACKGROUND OF THE INVENTION

The spin cycle of a washing machine removes water centrifugally from wet clothes by spinning the clothes at high speed in a spin basket. In order to reduce the possibility of injury to the user during the spin cycle, it is known to use an electronically actuated lock for holding the washing machine lid in the closed position. U.S. Pat. Nos. 6,363,755; 5,823,017; and 5,520,424, assigned to the present assignee and hereby incorporated by reference, describe several locking mechanisms.

In order to prevent tampering with the lock mechanism, for example, by holding the lid open when the lock is actuated, it is known to provide for lid closure sensing to ensure that the lid is in a proper position before the lock mechanism is engaged. Conventional mechanical lid closure switches can often be defeated by wedging the switch open, for example, with the end of a pencil or the like. U.S. Pat. No. 7,251,961, assigned to the assignee of the present invention and hereby incorporated by reference, describes a lid sensor using a magnet and electrical reed switch to detect lid closure. The use of a magnetic actuator reduces the possibility of casual tampering.

US patent application 2012/0312594, hereby incorporated by reference, describes a lock mechanism in which the magnet is incorporated into a hook or striker that engages the latch. Tampering is detected by requiring that the striker physically move a latch element and magnetically move a separate anti-tampering element. Motion of both elements is detected and required before the appliance can be operated. Common sticks or probes for tampering with the latch will not provide the magnetic interaction with the anti-tampering elements and thus may be distinguished from the actual striker.

In each case, the use of a magnetically actuated element renders physical tampering difficult. Nevertheless, such magnetic systems add cost and complexity to the latching mechanism that may not be acceptable in all cases.

SUMMARY OF THE INVENTION

The present invention provides a latch for appliances that avoids the need for magnetically activated anti-tamper elements and yet provides strong anti-tamper resistance. These twin benefits are obtained by using an anti-tamper element that physically contacts the striker but contacts different features of the striker than those contacted by the other latch elements. A tampering tool is unlikely to duplicate all the necessary features of the striker to both actuate the latch and the anti-tamper feature.

For example, the anti-tamper element and the latch element may contact different forks of a bifurcation in the striker passing on opposite sides of a ward plate. Alternatively, the anti-tamper element and latch element may contact a front and rear surface of the striker element or a front and bottom surface of the striker. By providing contact with two different features, only a properly shaped striker element can activate the appliance.

Specifically then, one embodiment of the invention provides an appliance latch assembly having a striker and a corresponding latch for receiving the striker, the striker and latch positionable on an appliance lid and appliance frame. A trap contacts a first feature of the striker to move the trap from a first trap position to a second trap position as the striker is received by the latch and provides a surface holding the striker in the latch when the lock element is in the second trap position. An electrically actuated lock may be actuated to hold the trap in the second position and an anti-tamper operator contacts a second feature of the striker different from the first feature to move from a first operator position to a second operator position when the trap moves to the second operator position. A first electrical switch communicates with the lock to provide an indication that the lock is actuated to hold the trap in the second trap position and a second electrical switch communicates with the anti-tamper operator to provide an indication that the anti-tamper operator is in the second operator position.

It is thus a feature of at least one embodiment of the invention to provide a simple physically actuable mechanism that resists tampering by common tools.

The striker may include a joint allowing it to move with the trap.

It is thus a feature of at least one embodiment of the invention to integrate movement of the striker into the latch operations to further resist tampering with tools that may not be able to negotiate this movement.

The surface of the trap holding the striker in the latch may hold the striker in engagement against a stationary portion of the latch when the trap moves to the second trap position.

It is thus a feature of at least one embodiment of the invention to leverage the robustness of the stationary structure of the latch to hold the striker in position.

The striker may be pivoted for travel perpendicularly to the axis and include a spring urging the striker in a first direction perpendicular to the axis.

It is thus a feature of at least one embodiment of the invention to provide a consistent location of the striker as it enters the latch while allowing movement.

The anti-tamper operator and the trap may move in the same direction in parallel to each other when the striker is received by the latch trap and moves from the first trap position to the second trap position and the anti-tamper operator moves from the first operator position to the second operator position.

It is thus a feature of at least one embodiment of the invention to provide a simple mechanism in which the anti-tamper switch and lock actuated mechanism may be offset in the same direction away from the latch opening.

The first and second feature of the striker may be different forks of a bifurcation on a front surface of the striker and wherein the different forks of the bifurcation pass on opposite sides of a stationary ward plate when the striker engages the latch.

It is thus a feature of at least one embodiment of the invention to provide a key-like structure that prevents defeat with a simple blunt tool.

The striker may provide a hook portion extending generally perpendicularly to a direction of engagement of the striker and the latch and wherein the bifurcation is in the hook portion.

It is thus a feature of at least one embodiment of the invention to offset the physically contacting portions on a hook to further reduce the likelihood of defeat it with commonly available tools such as pencils.

Alternatively, the first and second feature of the striker may be a front and rear surface of the striker, and the trap and anti-tamper operator may move in opposite directions as the striker engages the latch and the trap moves from the first trap position to the second trap position and the anti-tamper operator moves from the first operator position to the second operator position.

It is thus a feature of at least one embodiment of the invention to further resist tampering by requiring simultaneous movement in opposite directions, difficult to obtain with common tools.

The trap and anti-tamper operator may present a funnel-shaped opening between them receiving the striker so that the striker separates the trap and anti-tamper operator as it is received in the latch.

It is thus a feature of at least one embodiment of the invention to provide a simple method of providing opposite motion of the trap and anti-tamper operator that effectively require specific dimensions of the striker for proper operation.

The anti-tamper operator movement may be limited so that separation of the trap and anti-tamper operator as the striker is received within the latch guarantees a predetermined movement of the latch element.

It is thus a feature of at least one embodiment of the invention to provide opposite motion of the trap and anti-tamper operator while ensuring proper locking.

Alternatively, the first and second features of the striker may be a front and bottom surface of the striker.

It is thus a feature of at least one embodiment of the invention to provide not only different critical dimensions of the striker but also dimensions along different axes further obstruct tampering.

The trap and anti-tamper operator may move in perpendicular directions as the striker engages the latch and the trap moves from the first trap position to the second trap position and the anti-tamper operator moves from the first operator position to the second operator position.

It is thus a feature of at least one embodiment of the invention to require two axes of movement of a tampering tool to successfully defeat the lock, thereby significantly reducing the possibility of such defeat.

The electrically actuated lock may be a solenoid and bistable mechanism moving a blocking element between receipt by the trap and removal from the trap with successive energizing of the solenoid and wherein the lock signal is a first energizing and the unlock signal is a second energizing of the solenoid.

It is thus a feature of at least one embodiment of the invention to provide a latch that can resist power loss as a possible method of defeating the latch.

Motion of the striker to disengage the striker from the latch when the blocking element is received by the trap may cause an abutting of the blocking element against a frangible portion of the trap which, when broken, prevents activation of the lock switch. The frangible portion of the trap may support a spring element away from an opening into which the blocking element may be received such that removal of the frangible element causes the spring element to occlude the opening.

It is thus a feature of at least one embodiment of the invention to detect damage to the latch that might prevent operation.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a perspective view and inset fragmentary detail of a top loading washing machine suitable for use with the present invention showing a striker aperture positioned near the front of an upwardly opening lid and showing a downwardly extending striker for engaging a latch when the lid is closed;

FIG. 2 is a fragmentary planar cross section of the latch and striker of FIG. 1 (viewed from below) showing a floating mounting of the striker allowing close tolerance interaction between the striker and latch to move a trap element to a retaining and locking position;

Figure 3:
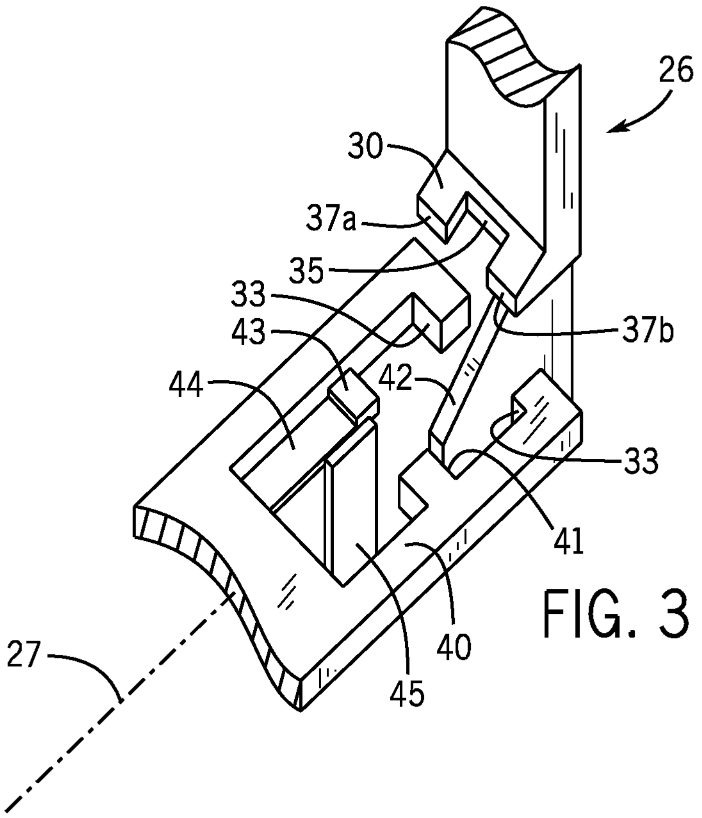
FIG. 3 is a fragmentary perspective view of the striker guided by a sloping surface of the latch into engagement with a trap.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENT

Referring now to FIG. 1, a top loading washing machine 10 suitable for use with the present invention includes a lid 12 opening upward about a horizontal lid hinge axis 14. The lid hinge axis 14 is positioned near the top rear edge of the washing machine 10 so that a front edge 16 of the lid 12 may raise and lower to expose and cover an opening 20 through which clothing may be inserted into the spin basket.

A horizontal surface of the top 22 of the washing machine 10, at the periphery of the opening 20, may support a striker aperture 24 extending from a housing 21 of a latch 25 fastened to the underside of the top 22. The striker aperture 24 opens upward to receive a downwardly extending striker 26 attached to an underside of the lid 12. Both the striker aperture 24 and the striker 26 are offset parallel to the axis 14 and offset from a center of the front edge 16 so as to minimize interference with loading and unloading the washing machine 10.

The top-loading washing machine 10 may also provide for a controller board 11, for example, including a processor executing a program stored in computer memory. The controller board may receive signals from the latch 25 via harness 82 and from controls 13 accessible to the user to control operation of one or more electric actuator such as motor 15 actuating a spin basket or the like.

Referring now to FIG. 2, the striker 26 may include a downwardly extending arm 28 terminating in a hook portion 30 extending leftward from the arm 28, as shown in FIG. 2, generally toward a user of the washing machine 10. The upper end of the arm 28 may be mounted to the lid 12 by a hinge element 17 to pivot left and right as indicated by arrows 32 with respect to the lid 12 under restoring spring forces indicated schematically by springs 34. The hinge element 17 may be a pivot joint with springs 34 or a living hinge having natural resiliency. In this way, the left and right surfaces of the hook portion 30 may translate as may be necessary to accommodate positional tolerances in the manufacture of the washing machine 10 and wear of the washing machine 10 and to provide movement of a trap to be described.

As the lid is closed, the hook portion 30 moves toward the striker aperture 24 and is guided rightward by a right facing first sloping edge 36 of an aperture bezel 38 defining the striker aperture 24. The aperture bezel moves the hook portion 30 to position 29*b* with a left edge of the striker 26 aligned at first position 31 with the right edge of an un-retracted trap 40 (shown in a forward, retracted position in FIG. 2). The striker 26 is then urged left by a left facing second sloping edge of ramp 42 so as to push the trap 40 leftward against a restoring spring (not shown in FIG. 2) so that a left edge of an opening in the trap 40 is moved to position 31' as hook portion 30 passes to position 29*c*.

A following surface 33 of the trap 40, when the trap is moved forward with the striker 26 in position 29*c*, prevents rightward movement of the hook portion 30 when the trap 40 is latched as will be described below, trapping the striker 26 beneath a stationary ledge on the underside of the sloping edge 36. This serpentine path defined by sloping edges 36 and sloping surface of ramp 42 ensures that the left edge of the striker 26 abuts the leading surface 41 of the trap 40 in close proximity despite tolerance variations between the lid 12 and the top 22 and allows the striker 26 to move the trap 40 to the forward position needed for locking as will be described.

Referring now to FIG. 3, and referring to directions as depicted in that figure, in a first embodiment, the hook portion 30 maybe bifurcated into left and right teeth 37*a* and 37*b* separated by a slot 35. The right tooth 37*b* may contact the leading surface 41 of the trap 40 to push it forward as described above with respect to FIG. 2 as the rear edge of the striker 26 is pressed forward by interaction with the ramp 42. At the same time, the left tooth 37*a* may push against an upwardly extending finger 43 on anti-tamper slide 44, the latter of which may slide along the axis 27 as will be discussed below.

Figure 4:
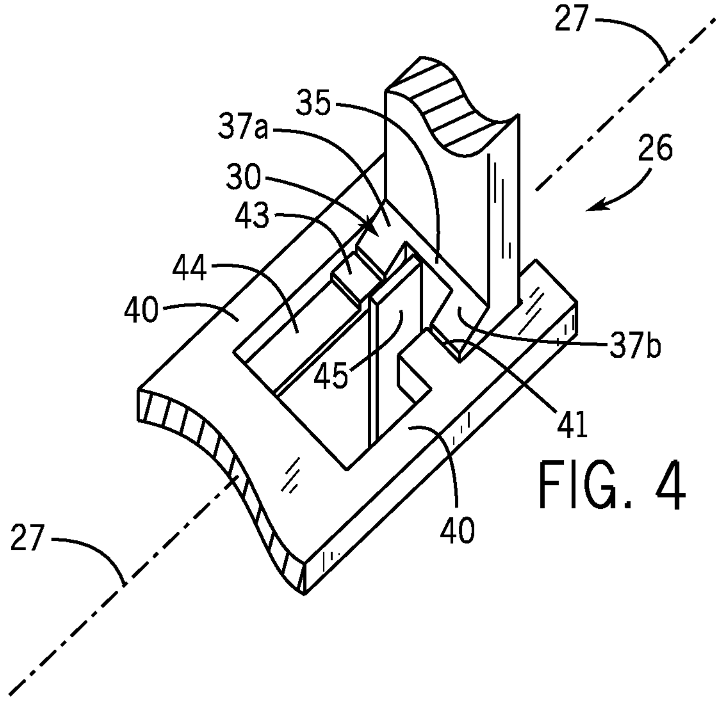
FIG. 4 is a figure similar to that of FIG. 3 showing the hook of the striker fully engaged and retained by the trap pushing the trap and an anti-tamper slide forward.

An upwardly extending ward plate 45 is attached to the stationary structure of the latch 25 to extend between the leading surface 41 of the trap 40 and the finger 43 on the anti-tamper slide 44 so that, as shown in FIG. 4, the hook portion 30 may engage the trap 40 and push the trap 40 along axis 27 by the interaction of tooth 37*b* and leading surface 41, and push the upwardly extending finger 43 on anti-tamper slide 44 by tooth 37*a*, only if slot 35 is present allowing the hook portion 30 to pass around the ward plate 45. The ward 45 thus defeats actuation of the latch 25 by a non-bifurcated probe.

Figure 5:
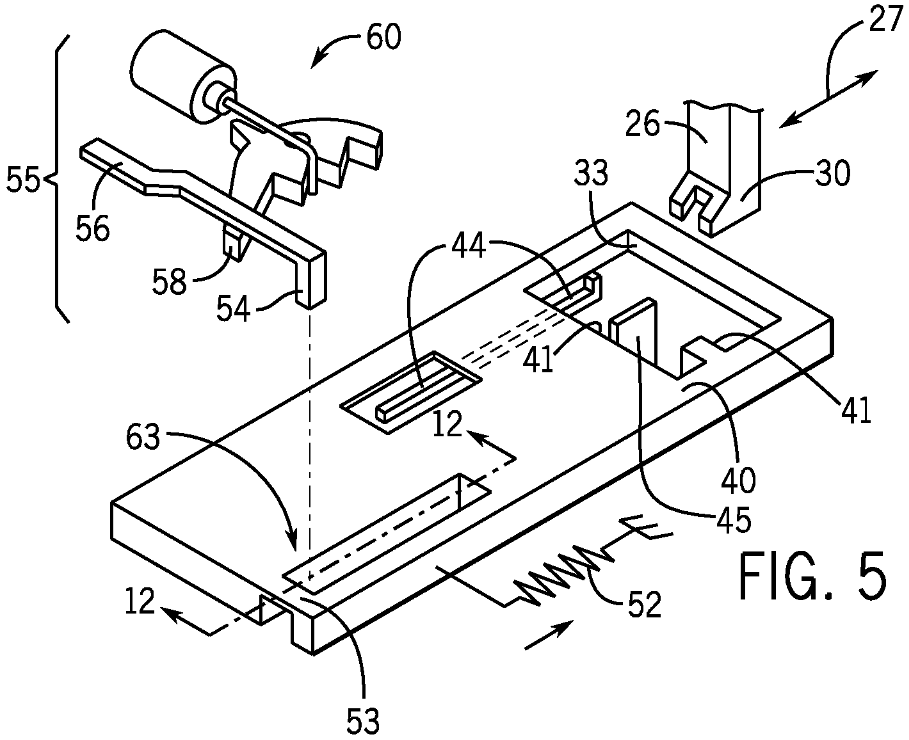
FIG. 5 is a simplified perspective view of the trap engaging the striker showing the positioning of the anti-tamper slide in an aperture at the front of the trap and showing a bi-stable actuator above the trap for controlling a blocking element descending into the trap to block movement of the trap.

Referring now to FIG. 5, the sliding trap 40 is normally biased rightward by a biasing spring showed schematically as spring 52 to engage hook portion 30 when hook portion 30 is moved into position 29*c* shown in FIG. 2, then to hold the hook portion 30 underneath the stationary latch structure of the aperture bezel 38 against upward motion. The trap 40 includes an aperture 63 at its left edge. When the trap 40 is moved leftward, forward capturing the hook portion 30, the aperture 63 aligns with a blocking element 54 which may descend into the aperture 63 from an actuator mechanism 55 positioned above the trap 40. In this configuration, rightward movement of the trap 40 is stopped by interference between a left surface of the blocking element 54 abutting a blockade surface 53 forming a left wall of the aperture 63. Thus, the trap 40 acts as a trap to hold the striker 26 in position when the blocking element 54 acts as a blocking element to the trap 40.

Figure 6:
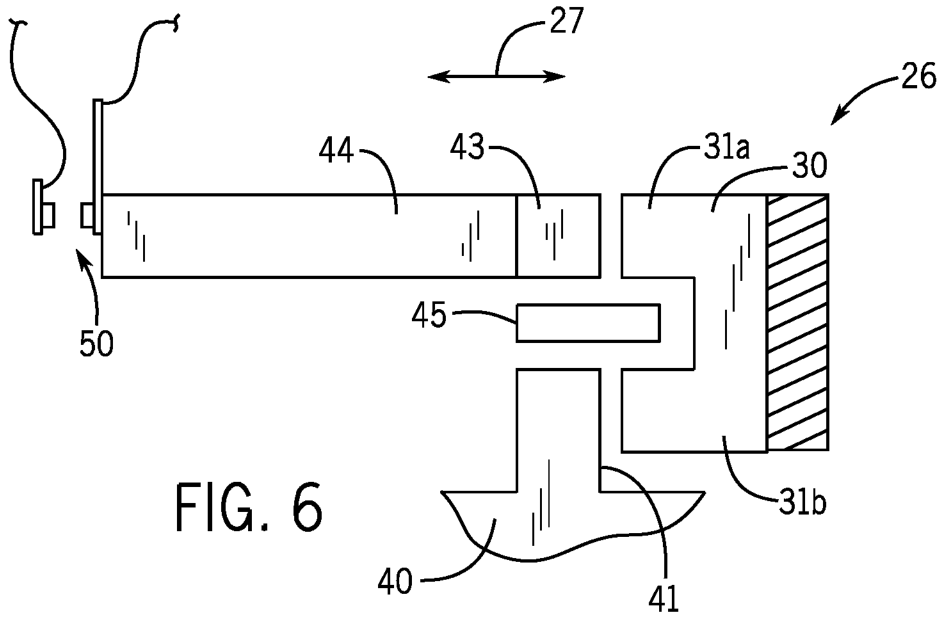
FIG. 6 is a top plan view of the hook of the striker with respect to the trap in partial fragment showing engagement of the hook with the trap and the anti-tamper slide.

Referring now to FIGS. 5, 9, 12*a* and 12*b*, the blocking element 54 may be moved downward under the influence of a flexible leaf spring 56. The flexible leaf spring 56 holds one of a pair of contacts of a lock switch 57 indicating proper locking of the latch 25 when the blocking element 54 is lowered and the contacts connect, closing the lock switch 57. At this time, the blocking element 54 may only be disengaged by action of a bistable solenoid mechanism 60 (shown schematically in FIG. 5 and described below) providing a wedge element 58 that may lift the leaf spring 56 to raise the blocking element 54 by contacting a sloped portion 59 of the leaf spring 56. Referring still to FIG. 6, motion of the anti-tamper switch along axis 27 closes anti-tamper switch 50 allowing operation of the lock.

It will be appreciated that the solenoid 62 may be replaced with a variety of other actuator types including thermal actuators (such as bimetal actuators, muscle wire, or wax motors) or mechanisms such as DC motors with rack and pinion gearing or lead screws or the like.

While the bistable solenoid mechanism 60 prevents defeat of the lock mechanism by removing power from the appliance, the invention also contemplates other methods of preventing such premature release, for example, implementing a "cool-down" period of time after power loss before which the latch could not be released. This cool-down period may be implemented by actual thermal cooling of a thermal actuator holding the latch in a locked state or by power reserved, for example, in a capacitor or the like, that may be used in conjunction with a timing mechanism to release the bistable solenoid mechanism 60 by providing a releasing pulse of electricity a fixed period of time after line power is lost.

The blockade surface 53 may be formed by a thin member that can break away if the lock is forcibly opened by pressing rightward on the trap 40 when the blocking element 54 has descended, such as may occur from a forcible extraction of the striker 26. When the blockade surface 53 is broken away, a leaf spring 71 positioned on the under surface of the trap 40 is free to move upward and carries with it the blocking element 54, opening contacts on the lock switch throughout the range of travel of the trap 40.

Figure 7A:
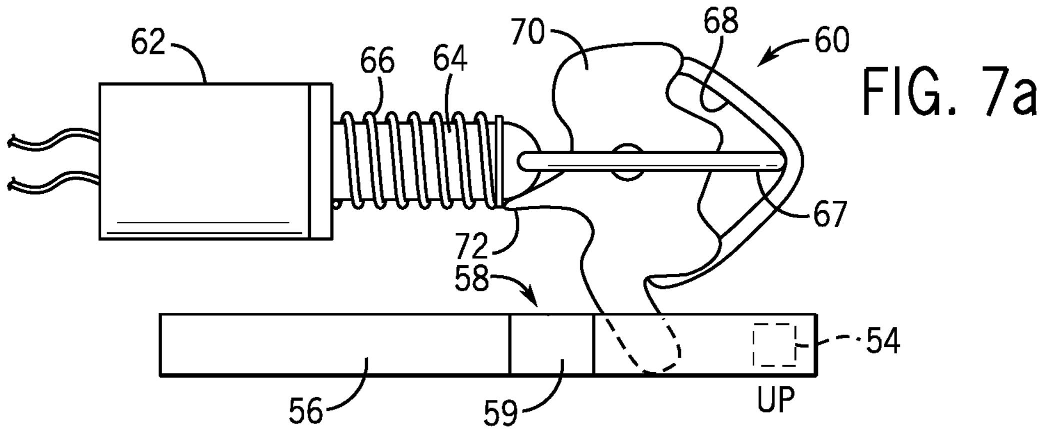
FIG. 7*a* is a top plan view of the bi-stable actuator of FIG. 5 in a first state removing the blocking element from engagement with the trap.
Figure 7B:
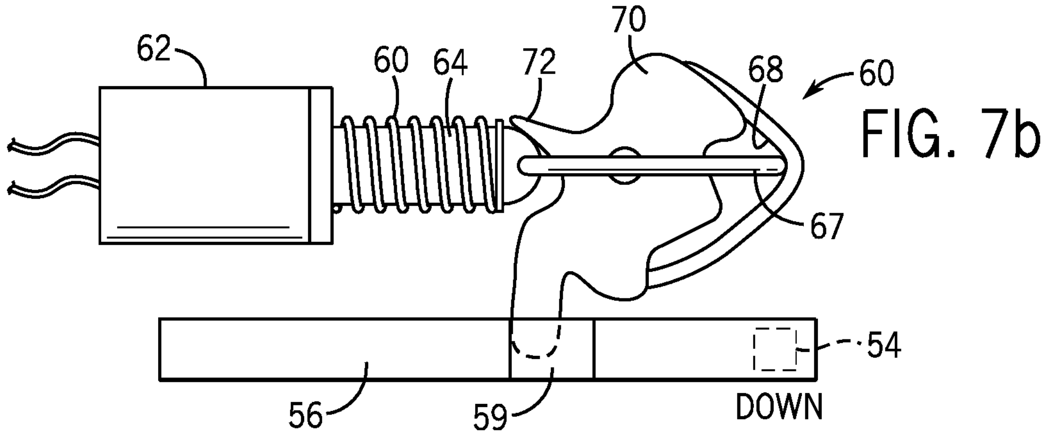
FIG. 7*b* is a figure similar to that of FIG. 7*a* showing the bi-stable actuator in a second state engaging the blocking element with the trap to prevent the movement of the trap.
Figure 9:
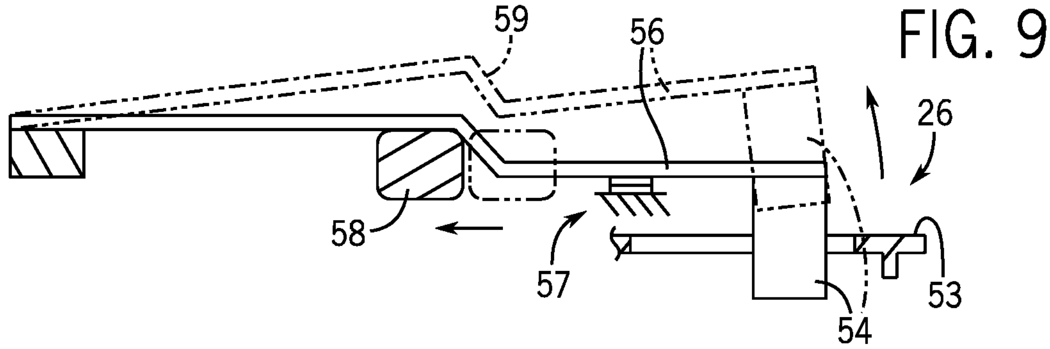
FIG. 9 is a side elevational view of the blocking element and lock switch of FIGS. 5, 7*a* and 7*b;*

Referring now to FIGS. 9, 7*a* and 7*b*, the bi-stable mechanism may include an electrical solenoid 62 having a plunger 64 pulled into the solenoid when the solenoid is actuated. The plunger 64 may be surrounded by a helical compression spring 66 that extends the plunger 64 from the solenoid 62 when the solenoid 62 is not actuated. A distal end of the plunger 64 may connect to a pivoting hook 67 guided into alignment with an axis of the plunger 64 when the plunger is fully extended by means of an angled track 68 sloping to an apex spaced from the solenoid 62 and aligned with an axis of the plunger 64.

When the solenoid 62 is actuated, the hook 67 is drawn inward and contacts a serrated front surface of a rocking element 70 so that successive energizing of the solenoid 62, releasing and then pulling in the plunger 64, causes the rocking element 70 to rock between extremes depicted in FIGS. 7*a* and 7*b*. A serrated surface of the rocking element 70 guides the hook 67 to pull on opposite sides of the rocking element 70 as it moves from the resting position at the apex of the track 68, causing this bi-stable motion.

The rotated extreme, shown in FIG. 7*b* in a fully clockwise direction, normally provides a locked state for the trap 40, while the rotated extreme of FIG. 7*a* in a fully counterclockwise direction normally provides an unlocked state of the trap 40.

Referring again to FIG. 9, the unlocked state is associated with the wedge element 58 being positioned beneath a sloped portion 59 of the leaf spring 56 to raise the blocking element 54 from engagement with the aperture of the trap 40 (shown in FIG. 5). In contrast, the locked state is associated with the wedge element 58 being removed from the sloped portion 59 of the leaf spring 56, allowing the blocking element 54 to descend into the aperture of the trap 40.

Figure 8:
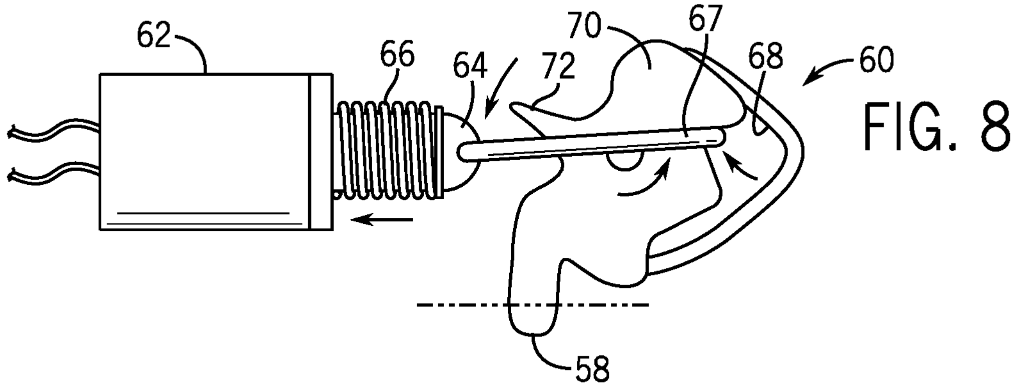
FIG. 8 is a view similar to that of FIGS. 7*a* and 7*b*, with the blocking element and supporting lock switch removed for clarity, showing actuation of the solenoid during movement between the states of FIGS. 7 and 8 such as frees an anti-vibration tooth for clearance of the solenoid plunger.

Referring now to FIGS. 7*a*, 7*b*, and 8, the rocking element 70 may have an anti-vibration tooth 72 extending leftward therefrom to abut an end of the plunger 64 when the solenoid 62 is not being energized and yet is fully extended by helical springs 66. The anti-vibration tooth 72, which is positioned abutting opposite sides of the extended plunger 64 for the unlocked state of FIG. 7*a* and the locked state of FIG. 7*b*, prevents rotation of the rocking element 70 from vibration alone so long as the solenoid plunger 64 is fully extended. When the solenoid 62 is actuated, however, as shown in FIG. 8, a pulling in of the solenoid plunger 64 allows the anti-vibration tooth 72 to slip past the end of the plunger 64 and rotation of the rocking element 70 to occur.

Figure 10:
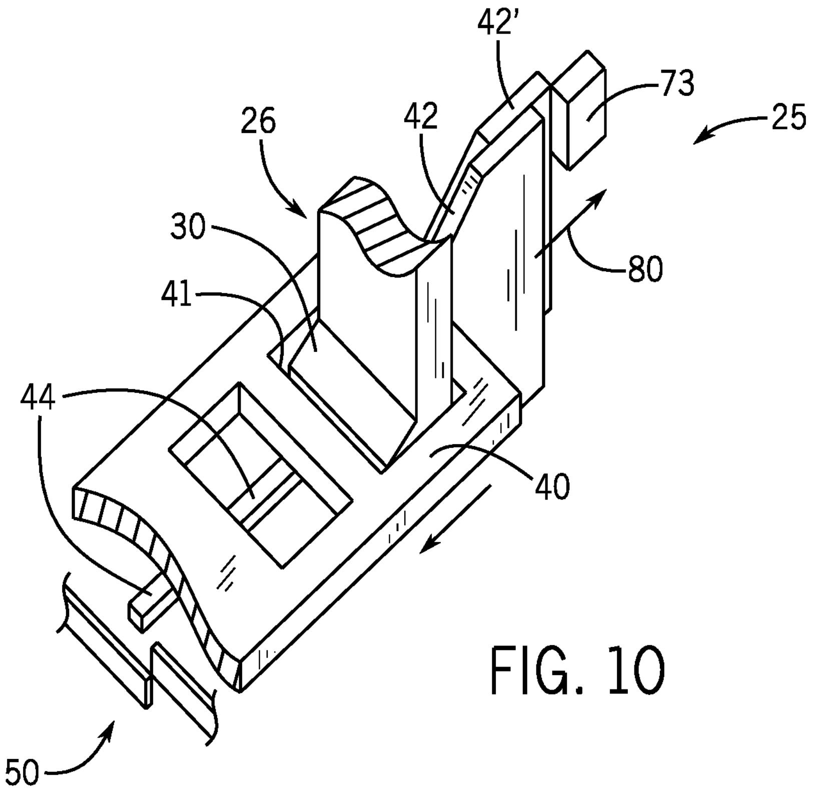
FIG. 10 is a figure similar to that of FIG. 3 showing an alternative embodiment of the invention in which a sloping guide surface in the latch guides the rear of the striker forward to move the trap while simultaneously retracting rearward to control the anti-tamper slide.

Referring now to FIG. 10, in an alternative embodiment, the hook portion 30 need not be bifurcated (although bifurcation and a ward plate 45 may be used) and the ramp 42 is movable with respect to the stationary structure of the latch 25 to accommodate limited rearward motion under the force from the striker 26 as indicated by arrow 80. A second rearwardly displaced ramp 42' may be fixed with respect to the stationary structure of the latch 25 ensuring forward movement of the striker 26 as it is inserted into the latch 25 after limited rearward motion of the ramp 42. Alternatively, a blocking element 73 may be fixed with respect to the stationary structure of a latch 25 to limit the rearward movement of the ramp 42 so that it continues to move the striker 26 forward as required after the limited rearward movement.

In either case, forward motion of the trap 40 again serves to lock the striker 26 in place and rearward motion of the ramp 42 is used to provide for activation of the anti-tamper feature by moving anti-tamper slide 44, now communicating with contacts 50, the latter of which are closed by rearward motion of the ramp 42 indicated by arrow 80. In this case, motion of the trap 40 to lock the striker 26 and motion of the anti-tamper slide 44 are in opposite directions. Thus, a single probe pressing on leading surface 41 will not be sufficient to activate the latch 25 and activate the anti-tamper switch 50.

Figure 11:
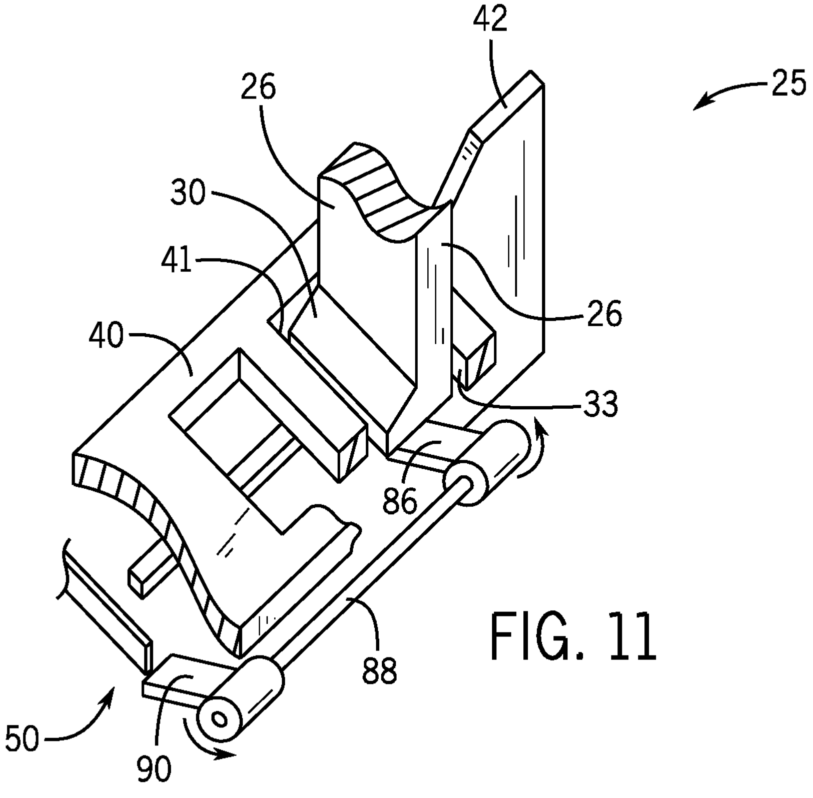
FIG. 11 is a figure similar to that of FIGS. 3 and 10 showing an alternative embodiment in which a rotating toggle arm actuated by a bottom of the striker is used in place of the anti-tamper slide.
Figure 12A:
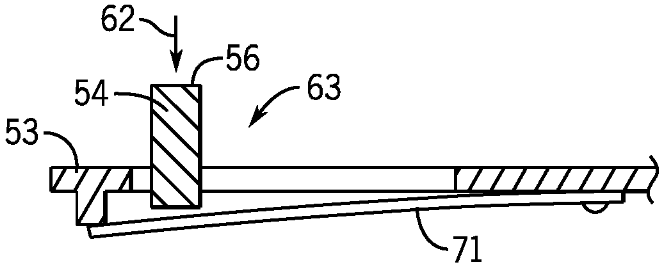
FIGS. 12*a* and 12*b* are cross-sectional views taken along line 12-12 of FIG. 5 showing engagement of a blocking element within the aperture of the trap and showing a blocking of that engagement when aperture integrity has been compromised through forcing open of the latch.
Figure 12B:
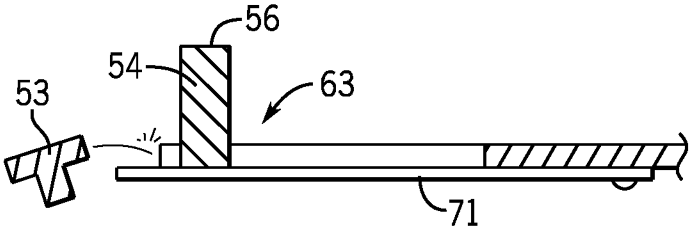

Referring now to FIG. 11, in yet a further alternative embodiment, the ramp 42 is again fixed with respect to the frame of latch 25 per the embodiments of FIGS. 3 and 4, and downward motion of the hook portion 30 of the striker 26 causes a bottom surface of the striker 26 to activate a paddle 86 communicating with a rotating axle 88 extending along axis 27 to rotate that axle 88. The axle 88 may have a tandem paddle 90 activating anti-tamper switch 50 with downward motion of the paddle 86 and rotation of the axle 88. Thus a single probe pressing on leading surface 41 of the trap 40 will not normally also activate anti-tamper switch 50.

In all of the above cases, the striker 26 moves the trap 40 guided by a ramp 42 or 42' on the housing 21. When the necessary travel of the trap 40 is achieved the portion of the ramp 42 or 42' against the rear of the striker 26 is vertical. Additional travel downward of the striker 26 results in no significant movement of the trap 40. This has many benefits in the design. One is that at a certain travel of striker 26 downward, the blocking position of the trap 40 is accomplished and allowing blocking. Additional travel of the striker 26 downward does not affect the position two of trap 40. The force of a lid slam is absorbed by the lid stops (between the lid and the appliance housing), not the structure of the latch 25.

In all of the above embodiments, multiple points of physical contact between the hook portion 30 and independent features of the latch 25 are required for activating the latch and indicating that the latch has not been tampered with.

Generally both activation of switch 50 (corresponding to the anti-tamper slide 44) and closure of the lock switch 57 are communicated with the controller board 11 which executes a stored program to prevent operation of the motor 15 unless both lock switch 57 is closed and switch 50 is closed.

Certain terminology is used herein for purposes of reference only, and thus is not intended to be limiting. For example, terms such as “upper”, “lower”, “above”, and “below” refer to directions in the drawings to which reference is made. Terms such as “left”, “right”, “front”, “back”, “rear”, “bottom” and “side”, describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms “first”, “second” and other such numerical terms referring to structures do not imply a sequence or order unless clearly indicated by the context.

When introducing elements or features of the present disclosure and the exemplary embodiments, the articles “a”, “an”, “the” and “said” are intended to mean that there are one or more of such elements or features. The terms “comprising”, “including” and “having” are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. An appliance latch assembly for use with an appliance having an appliance frame and an appliance lid movable during closing of the appliance lid between a lid-open position and a lid-closed position, the appliance latch assembly comprising:
- a latch positionable on the appliance frame and defining a latch interior that defines a full width interior segment and a divided interior segment that includes a first interior side space and a second interior side space;
- a ward plate arranged within the latch interior and defining boundaries between the full width interior segment and the divided interior segment of the latch interior, wherein the ward plate includes:
  - a first side surface that bounds the first interior side space;
  - a second side surface that bounds the second interior side space; and
  - an edge that faces toward the full width interior segment;
- an anti-tamper switch that is actuatable to prevent an operation of the appliance when the appliance lid is in the lid-open position or allow the operation of the appliance when the appliance lid is in the lid-closed position;
- a striker positionable on the appliance lid and insertable into the latch interior during closing of the appliance lid, wherein the striker:
  - includes a striker bifurcation defined by a first fork and a second fork that pass on opposite sides of the ward plate during closing of the appliance lid; and
  - actuates the anti-tamper switch to allow operation of the appliance when the first and second forks of the striker bifurcation are respectively in the first and second latch interior segments.

2. The appliance latch of claim 1 further comprising:
- a trap arranged at least partially in the latch interior and movable with respect to the latch to define an open position and a locked position; wherein the trap:
  - in the open position allows insertion of the striker into the latch interior; and
  - in the locked position prevents withdrawal of the striker from the latch interior.

3. The appliance latch of claim 2 wherein during closing of the appliance lid:
- the first fork of the striker bifurcation actuates the anti-tamper switch; and
- the second fork of the striker bifurcation moves the trap from the open position to the locked position.

4. The appliance latch of claim 3 further comprising:
- an electrically actuated lock as a trap lock configured to selectively hold the trap in the locked portion; and
- an electrical switch as a trap-lock switch communicating with the trap lock to provide an indication that the trap is in the locked position.

5. The appliance latch of claim 4 wherein the second fork of the striker bifurcation actuates the trap-lock switch to communicate with the with the lock for holding the trap in the locked position.

6. The appliance latch of claim 5 wherein the trap lock includes a bistable mechanism defining a stable position of the trap at each of the open and locked positions.

7. The appliance latch of claim 2 wherein:
- the striker defines a front surface facing the ward plate when the striker is inserted in the latch interior; and
- each of the first and second forks of the striker bifurcation extend from the front surface of the striker.

8. The appliance latch of claim 7 further comprising a joint that allows:
- movement of the striker relative to the appliance lid; and
- movement of the striker in unison with the trap.

9. The appliance latch of claim 7 wherein:
- the striker defines a striker upper end closest to the appliance lid and a striker lower end furthest from the appliance lid;
- the joint includes a hinge at the striker upper end; and
- the striker bifurcation is defined at the striker lower end.

10. The appliance latch of claim 9 further comprising a ramp arranged within the latch interior that angularly deflects the striker lower end toward the ward plate during insertion of the striker into the latch interior.

11. An appliance latch assembly for use with an appliance having an appliance frame and an appliance lid movable during closing of the appliance lid between a lid-open position and a lid-closed position, the appliance latch assembly comprising:
- a striker positionable on the appliance lid;

a latch positionable on the appliance frame and having a latch frame defining a latch interior with a full width interior segment and a divided interior segment;

a trap movably mounted in the latch interior and having a pair of trap side walls defining side boundaries of a trap interior within the latch interior that receives the striker during closing of the appliance lid;

a ward plate fixedly mounted in the latch interior and providing a boundary between a pair of spaces and that define the divided interior segment, the ward plate arranged between and parallel to the trap side walls;

an anti-tamper slide arranged between and movable with respect to each of the ward plate and one of the trap side walls with the anti-tamper slide; and a leading surface arranged between the ward plate and the other one of the trap side walls with the leading surface movable with respect to the ward plate and moving in unison with the trap.

* * * * *